(12) United States Patent
Koseki et al.

(10) Patent No.: US 8,387,063 B2
(45) Date of Patent: Feb. 26, 2013

(54) STORAGE APPARATUS AND LOAD BALANCING METHOD

(75) Inventors: Hideyuki Koseki, Yokohama (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1870 days.

(21) Appl. No.: 11/598,664

(22) Filed: Nov. 14, 2006

(65) Prior Publication Data

US 2008/0092143 A1    Apr. 17, 2008

(30) Foreign Application Priority Data

Sep. 29, 2006    (JP) .................................. 2006-267493

(51) Int. Cl.
*G06F 9/46*    (2006.01)

(52) U.S. Cl. ........................................ 718/105

(58) Field of Classification Search .................... 718/105
See application file for complete search history.

(56) References Cited

U.S. PATENT DOCUMENTS

| | | |
|---|---|---|
| 2002/0124137 A1 | 9/2002 | Ulrich et al. |
| 2004/0255026 A1 | 12/2004 | Blount et al. |
| 2006/0031648 A1 | 2/2006 | Ishikawa et al. |

FOREIGN PATENT DOCUMENTS

| | | |
|---|---|---|
| JP | 2006-053601 | 2/2006 |
| WO | WO 00/13078 | 3/2000 |

OTHER PUBLICATIONS

P. Scheuermann, et al., "Data Partitioning and Load Balancing in Parallel Disk Systems", vol. 7, Feb. 1, 1998, pp. 48-66.
"A Case for redundant Arrays of Inexpensive Disks (RAID)" David A. Patterson, Garth Gibson, and Randy H. Katz, the ACM SIGMOD, International Conference on Management of Data, pp. 109-116, Jun. 1988.

*Primary Examiner* — Mengyao Zhe
(74) *Attorney, Agent, or Firm* — Antonelli, Terry, Stout & Kraus, LLP.

(57) ABSTRACT

This storage apparatus having a plurality of physical devices for balancing and retaining data sent from a host computer and parity of the data for each prescribed unit includes a load ratio calculation unit for calculating a load ratio of the plurality of physical devices, a load ratio determination unit for determining whether the load ratio of the physical devices calculated with the load ratio calculation unit exceeds a prescribed threshold value, a command ratio determination unit for determining whether a command ratio of either a write command or a read command issued from the host computer exceeds a prescribed threshold value when the load ratio determination unit determines that the load ratio of the physical device exceeds a prescribed threshold value, and a change unit for changing the data and the parity among the plurality of physical devices when the command ratio determination unit determines that the command ratio exceeds a prescribed threshold value.

12 Claims, 10 Drawing Sheets

FIG.2

| STRIPE NUMBER | LOGICAL ADDRESS | | | DATA PHYSICAL ADDRESS | | | PARITY | | |
|---|---|---|---|---|---|---|---|---|---|
| | LUN | TOP LBA | END LBA | HDD NUMBER | TOP LBA | END LBA | HDD NUMBER | TOP LBA | END LBA |
| 0 | 1 | 0 | 129024 | 1-0 | 0 | 129024 | 1-2 | 0 | 129024 |
| | 1 | 129025 | 260096 | 1-1 | 0 | 129024 | | | |
| 1 | 1 | 260097 | 391168 | 1-0 | 129025 | 260096 | 1-1 | 129025 | 260096 |
| | 1 | 391169 | 522240 | 1-2 | 129025 | 260096 | | | |
| 2 | 1 | 522241 | 653312 | 1-1 | 260097 | 391168 | 1-0 | 260097 | 391168 |
| | 1 | 653313 | 784384 | 1-2 | 260097 | 391168 | | | |
| 3 | 1 | 784385 | 915456 | 1-0 | 391169 | 522240 | 1-2 | 391169 | 522240 |
| | 1 | 915457 | 1046528 | 1-1 | 391169 | 522240 | | | |
| 4 | 1 | 1046529 | 1177600 | 1-0 | 522241 | 653312 | 1-1 | 522241 | 653312 |
| | 1 | 1177601 | 1308672 | 1-2 | 522241 | 653312 | | | |
| 5 | 1 | 1308673 | 1439744 | 1-1 | 653313 | 784384 | 1-0 | 653313 | 784384 |
| | 1 | 1439745 | 1570816 | 1-2 | 653313 | 784384 | | | |
| 6 | 1 | 1570817 | 1701888 | 1-0 | 784385 | 915456 | 1-2 | 784385 | 915456 |
| | 1 | 1701889 | 1832960 | 1-1 | 784385 | 915456 | | | |
| 7 | 1 | 1832961 | 1964032 | 1-0 | 915457 | 1046528 | 1-1 | 915457 | 1046528 |
| | 1 | 1964033 | 2095104 | 1-2 | 915457 | 1046528 | | | |
| ... | ... | ... | ... | ... | ... | ... | ... | ... | ... |

| RAID GROUP NUMBER 1321 | HDD NUMBER 1322 | PHYSICAL DISK LOAD RATIO 1323 | AVERAGE PHYSICAL DISK LOAD RATIO 1324 | AVERAGE WRITE COMMAND RATIO 1325 | AVERAGE READ COMMAND RATIO 1326 | DATA-PARITY CHANGE EXECUTION ATTRIBUTE 1327 |
|---|---|---|---|---|---|---|
| 0 | 1-1 | 60% | 65% | 84% | 16% | WRITE |
|   | 1-2 | 95% |   |   |   |   |
|   | 1-3 | 40% |   |   |   |   |
|   | 1-4 | 65% |   |   |   |   |
| ... | ... | ... | ... | ... | ... | ... |
| 5 | 2-7 | 99% | 88% | 45% | 55% | N/A |
|   | 2-8 | 80% |   |   |   |   |
|   | 2-9 | 86% |   |   |   |   |
| ... | ... | ... | ... | ... | ... | ... |

STORAGE APPARATUS AND LOAD BALANCING METHOD

CROSS REFERENCES

This application relates to and claims priority from Japanese Patent Application No. 2006-267493, filed on Sep. 29, 2006, the entire disclosure of which is incorporated herein by reference.

BACKGROUND

The present invention relates to a storage apparatus and a load balancing method and, for instance, can be suitably applied to a storage apparatus for controlling a load balance of physical disks.

Generally speaking, in order to yield a high I/O performance in a storage apparatus configured from a plurality of disks, it is necessary to exploit the performance of disks configuring the backend.

Here, a RAID (Redundant Arrays of Inexpensive Disks) configuration aiming to improve the reliability of data is often used for configuring the backend, and proposed is a storage apparatus capable of configuring RAID in various levels (for example, refer to Article: "A Case for Redundant Arrays of Inexpensive Disks (RAID)" David A. Patterson, Garth Gibson and Randy H. Katz.

Further, as one method of realizing the load balancing of disks, when a specific logical volume set in a physical volume enters an overloaded status, proposed is a method of copying the contents of such logical volume to a logical volume set in a backup physical device, and providing both logical volumes as one virtual logical volume to a host system in order to balance the load (for example, refer to Japanese Patent Laid-Open Publication No. 2006-053601).

Here, in a RAID configuration that performs striping processing, since data is distributed to a plurality of disks, there are cases where a single process is completed by accessing a plurality of disks. Thus, a problem arises in that the load will get centered on a specific disk configuring RAID and, when the overloaded disk reaches its processing limit, such disk will become a bottleneck and cause a processing delay, and the storage apparatus performance cannot be fully exploited (this problem is hereinafter referred to as a "diskneck").

According to the method proposed in Japanese Patent Laid-Open Publication No. 2006-053601, although it is possible to balance the load by allocating a backup physical volume disk and increasing the number of disks to handle a single logical volume, there is a problem in that the extent available to a user will decrease since a backup physical volume must be prepared.

SUMMARY

The present invention was made in view of the foregoing points. Thus, an object of this invention is to propose a storage apparatus capable of maintaining high-speed I/O performance and exploiting the storage apparatus performance.

In order to achieve the foregoing object, the present invention provides a storage apparatus having a plurality of physical devices for balancing and retaining data sent from a host computer and parity of the data for each prescribed unit. This storage apparatus comprises a load ratio calculation unit for calculating a load ratio of the plurality of physical devices, a load ratio determination unit for determining whether the load ratio of the physical devices calculated with the load ratio calculation unit exceeds a prescribed threshold value, a command ratio determination unit for determining whether a command ratio of either a write command or a read command issued from the host computer exceeds a prescribed threshold value when the load ratio determination unit determines that the load ratio of the physical device exceeds a prescribed threshold value, and a change unit for changing the data and the parity among the plurality of physical devices when the command ratio determination unit determines that the command ratio exceeds a prescribed threshold value.

Accordingly, since the load is equalized when the load is concentrated on a specific physical device, the physical device can be subject to load balancing while avoiding a situation of not being able to exploit the storage apparatus performance as a result of such physical device becoming a bottleneck and causing a processing delay.

The present invention further provides a load balancing method of a storage apparatus having a plurality of physical devices for balancing and retaining data sent from a host computer and parity of the data for each prescribed unit. This load balancing method comprises a first step for calculating a load ratio of the plurality of physical devices, a second step for determining whether the load ratio of the physical devices calculated at the first step exceeds a prescribed threshold value, a third step for determining whether a command ratio of either a write command or a read command issued from the host computer exceeds a prescribed threshold value when it is determined at the second step that the load ratio of the physical cal device exceeds a prescribed threshold value, and a fourth step for changing the data and the parity among the plurality of physical devices when it is determined at the third step that the command ratio exceeds a prescribed threshold value.

Accordingly, since the load is equalized when the load is concentrated on a specific physical device, the physical device can be subject to load balancing while avoiding a situation of not being able to exploit the storage apparatus performance as a result of such physical device becoming a bottleneck and causing a processing delay.

According to the present invention, as a result of calculating a load ratio of the plurality of physical devices, determining whether the load ratio of the physical devices exceeds a prescribed threshold value, determining whether a command ratio of either a write command or a read command issued from the host computer exceeds a prescribed threshold value when it is determined that the load ratio of the physical device exceeds a prescribed threshold value, and changing the data and the parity among the plurality of physical devices when it is determined that the command ratio exceeds a prescribed threshold value, the load is equalized when the load is concentrated on a specific physical device. Thus, the physical device can be subject to load balancing while avoiding a situation of not being able to exploit the storage apparatus performance as a result of such physical device becoming a bottleneck and causing a processing delay, and, as a result, is it possible to realize a storage apparatus and a load balancing method capable of maintaining high-speed I/O performance and exploiting the storage apparatus performance.

DESCRIPTION OF DRAWINGS

FIG. 2 is a conceptual diagram explaining an address management table;

FIG. 3 is a conceptual diagram explaining a data-parity change execution opportunity management table;

DETAILED DESCRIPTION

An embodiment of the present invention is now explained in detail with reference to the drawings.

Figure 1:
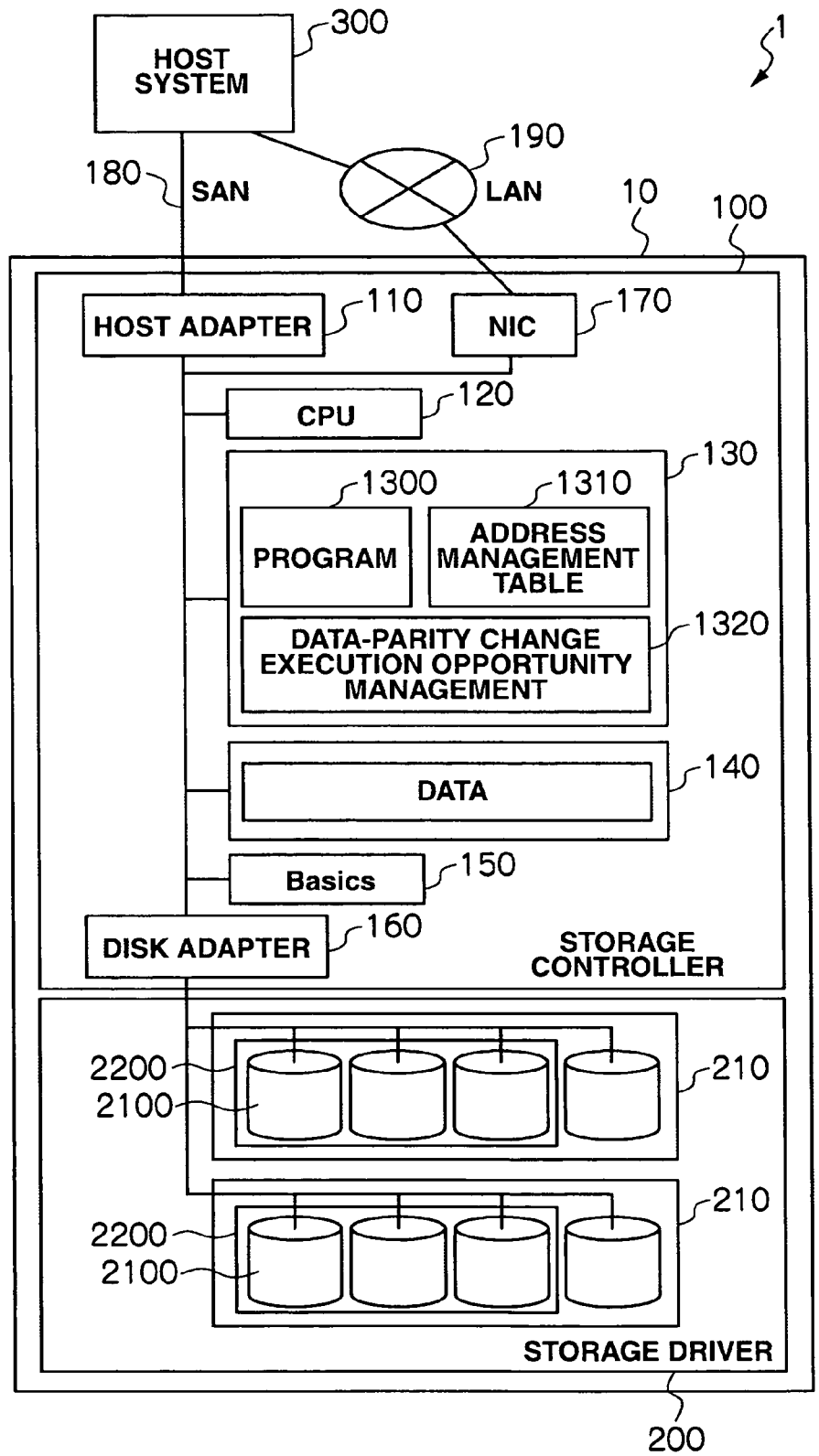
FIG. 1 is a block diagram schematically showing a storage system according to an embodiment of the present invention.

FIG. 1 is a configuration diagram showing the overall configuration of a storage system 1 according to an embodiment of the present invention. In FIG. 1, a storage apparatus 10 is configured from a storage controller 100 that controls the overall storage apparatus 10, and a storage driver 200 that provides a storage extent.

The storage apparatus 10 is connected to a host computer 300 of an application server or the like to become a host system that uses the storage apparatus 10 via a host adapter 110 of the storage controller 100.

Incidentally, a SAN (Storage Area Network) 180 as a dedicated network, for instance, is used as the interface for connecting the storage apparatus 10 and the host computer 300. Further, a fibre channel, SCSI (Small Computer System Interface), iSCSI (internet Small Computer System Interface), USB (Universal Serial Bus), IEEE (Institute of Electrical and Electronic Engineers) 1394 bus and the like may be used in configuring the SAN 180. Moreover, one or more host computers 300 may be connected to the storage apparatus 10.

In addition, control software for operating and setting the disk configuration of the storage apparatus 10 and controlling the operation of the storage apparatus 10 is installed in the host computer 300. The host computer 300 is able to issue commands to the storage apparatus and control the operation of the storage apparatus 10 with its control software. However, the storage apparatus 10 and the storage control software of the host computer 300, for instance, exchange data via an NIC (Network Interface Card) 170 of the storage apparatus 10 upon going through a LAN (Local Area Network) 190. Incidentally, a computer to manage and control the storage apparatus 10 may be different from the host computer 300.

The storage controller 100 is configured from a host adapter 110 for connecting the host computer 300 that uses the storage apparatus 10, a CPU (Central Processing Unit) 120 for controlling the overall storage apparatus 10, a memory 130 for storing programs and data required for the CPU 120 to control the storage apparatus 10, a cache memory 140 for temporarily storing data to be sent to and received from the host computer 300 and providing a high-speed response to data access, ASICs (Application Specific Integrated Circuits) 150 as application specific integrated circuits for performing parity calculation upon configuring RAID, and a disk adapter 160 for connecting the storage controller 100 and the storage driver 200.

The memory 130 stores a program 1300 to be used by the CPU 120 for controlling the storage apparatus 10, an address management table 1310 to be used for managing storage position information of data and parity in a physical disk 2100, and a data-parity change execution opportunity management table 1320 for managing information that determines the execution opportunity of changing the data and its parity (hereinafter referred to as a "data-parity change").

The storage driver 200 comprises a plurality of disk boxes 210, and comprises a plurality of physical disks 2100 (memory device) in the disk box 210. Here, the plurality of physical disks 2100 configure, for instance, a RAID group 2200 as illustrated in FIG. 1, and provide a large-capacity storage extent to the host computer 300 by configuring a logical unit (LU) (not shown), which is a logical storage extent, in the RAID group 2200. Further, in the present invention, the storage extent is configured in RAID 5 or RAID 6. Here, generally speaking, RAID 5 or RAID 6 is a RAID level for balancing and retaining data, and parity of such data in a plurality of physical disks 2100. Incidentally, in addition to the physical disk 2100, the present invention can also be applied to various other physical devices such as a semiconductor memory or the like.

FIG. 2 is a configuration diagram of the address management table 1310. The address management table 1310 is configured from a stripe line number column 1311, a logical address column 1312 and a physical address column 1313. Here, a stripe line represents a control unit for retaining the corresponding data and parity in a RAID level such as RAID 5 or RAID 6 for balancing and retaining data and parity in a plurality of disks.

The stripe line number column 1311 manages a number for uniquely identifying the strip line in the RAID group 2200. The logical address column 1312 and the physical address column 1313 manage information regarding which logical address of the logical unit actually corresponds to which address of the physical disks 2100. Further, the physical address column 1313 is configured from a data address column 1314 for managing the address of the physical disks 2100 storing data, and a parity address column 1315 for managing the address of physical disks 2100 storing parity. FIG. 2 shows an example of RAID 5 of 2D+1P in which there are two physical disks 2100 storing data and one physical disk 2100 storing parity. Although there is one level of the parity address column 1315 in the same stripe line, two levels of the parity address storage column 1315 are created in the same stripe line in the case of RAID 6.

The logical address column 1312 is configured from a LUN (Logical Unit Number) column 13121, a top LBA (Logical Block Address) column 13122, and an end LBA column 13123. The LUN column 13121 manages the number of the logical unit created in the RAID group 2200. The top LBA column 13122 and the end LBA column 13123 manage the top and end addresses of a logical address space of the logical unit.

The data address column 1314 is configured from a HDD (physical disk) number column 13141, a top LBA column 13142 and an end LBA column 13143. Further, the parity address column 1315 is configured from a HDD number column 13151, a top LBA column 13152 and an end LBA column 13153.

The HDD number columns 13141, 13151 manage the number of the physical disks 2100 as the storage destination of data and its parity. The top LBA column 13142 corresponds to the top LBA column 13122, the end LBA column 13143 corresponds to the end LBA column 13123, and they respectively manage the correspondence of the logical address space recognized by the host computer 300 and the physical address space as the actual data storage destination. Moreover, the top LBA column 13152 and the end LBA column 13153 manage the top and end addresses of the physical address space of the storage destination of parity.

Incidentally, in FIG. 2, physical position information of the physical disk 2100 is used as an example of an identifier of the HDD number columns 13141, 13151. For example, the HDD number "M-N" represents that the physical disk 2100 is mounted on the "N"th row of the "M"th disk box 210. Here, the "M"th disk box 210 is the disk box 210 located at the "M"th position when arranging a plurality of disk boxes 210 in one row. Further, the address management table 1310 is created and managed for each RAID group 2200.

FIG. 3 is a configuration diagram of a data-parity change execution opportunity management table 1320. The data-parity change execution opportunity management table 1320 is configured from a RAID group number column 1321, a HDD number column 1322, a physical disk load ratio column 1323, an average physical disk load ratio column 1324, an average write command ratio column 1325, an average read command ratio column 1326, and a data-parity change execution attribute column 1327.

The RAID group number column 1321 manages a number for uniquely identifying the RAID group 2200 created in the storage driver 200. The HDD number column 1322 manages a number for identifying the respective physical disks 2100 configuring the RAID group 2200. The physical disk load ratio column 1323 manages the load status of the current physical disk 2100, and, for instance, is represented with the operating ratio of the physical disk 2100.

The average disk load ratio column 1324 manages the average load ratio of the physical disk 2100 belonging to the respective RAID groups 2200, and is calculated with the physical disk load ratio in the physical disk load ratio column 1323. The average write command ratio column 1325 manages the ratio of write commands issued to the respective RAID groups 2200. Further, the average read command ratio column 1326 manages the ratio of read commands issued to the respective RAID groups 2200.

The data-parity change execution attribute column 1327 manages a parameter referred to upon issuing an execution command of data-parity change processing described later. "Read" (not shown in FIG. 3) or "write" is retained when it is necessary to execute data-parity change processing, and "N/A" is retained when it is not necessary to execute data-parity change. "N/A" is also retained when the RAID group 2200 is newly created. Moreover, a command ratio or the like of a logical unit configuring the RAID group 2200 may also be retained as a constituent element of the data-parity change execution opportunity management table 1320.

Incidentally, the data-parity change execution opportunity management table 1320 is updated each time the CPU 120 processes the respective commands of the read command and write command issued from the host computer 300 to the storage apparatus 10, and is referred to as information for determining the execution or non-execution upon executing the data-parity change processing described later.

Figure 4:
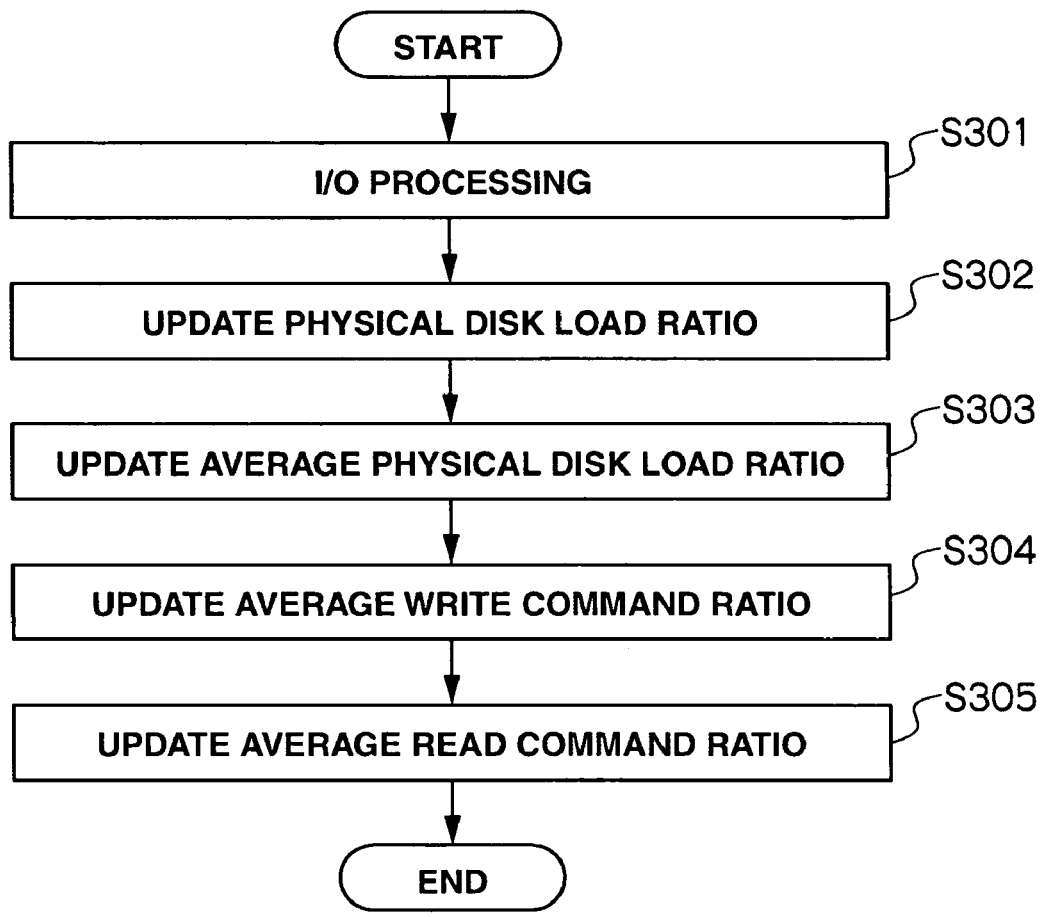
FIG. 4 is a flowchart explaining a data-parity change execution opportunity management table update processing routine.

FIG. 4 is a flowchart of the data-parity change execution opportunity management table update processing. When the CPU 120 receives an I/O command such as a read command or a write command issued from the host computer 300 to the storage apparatus 10, it starts the update processing of the data-parity change execution opportunity management table 1320, and executes the I/O processing for processing the received I/O commands (step S301).

Thereafter, pursuant to the I/O processing at step S301, the CPU 120 calculates the physical disk load ratio of a physical disk 2100 belonging to the RAID group 2200 subject to a disk access, and updates the physical disk load ratio column 1323 (step S302).

Subsequently, the CPU 120 calculates the average load ratio of the physical disks 2100 belonging to the RAID group 2200 based on information of the disk load ratio column 1323, and updates the average load ratio column 1324 (step S303).

Thereafter, the CPU 120 calculates the average write command ratio issued to the RAID group 2200, and updates the average write command ratio column 1325 (step S304). Then, the CPU 120 calculates the average read command ratio issued to the RAID group 2200, and updates the average read command ratio column 1326 (step S306). As a result of performing the foregoing steps, the CPU 120 ends the update processing of the data-parity change execution opportunity management table 1320. However, the update timing of the data-parity change execution opportunity management table 1320 can be executed before the start of I/O processing or midway during I/O processing.

Figure 5:
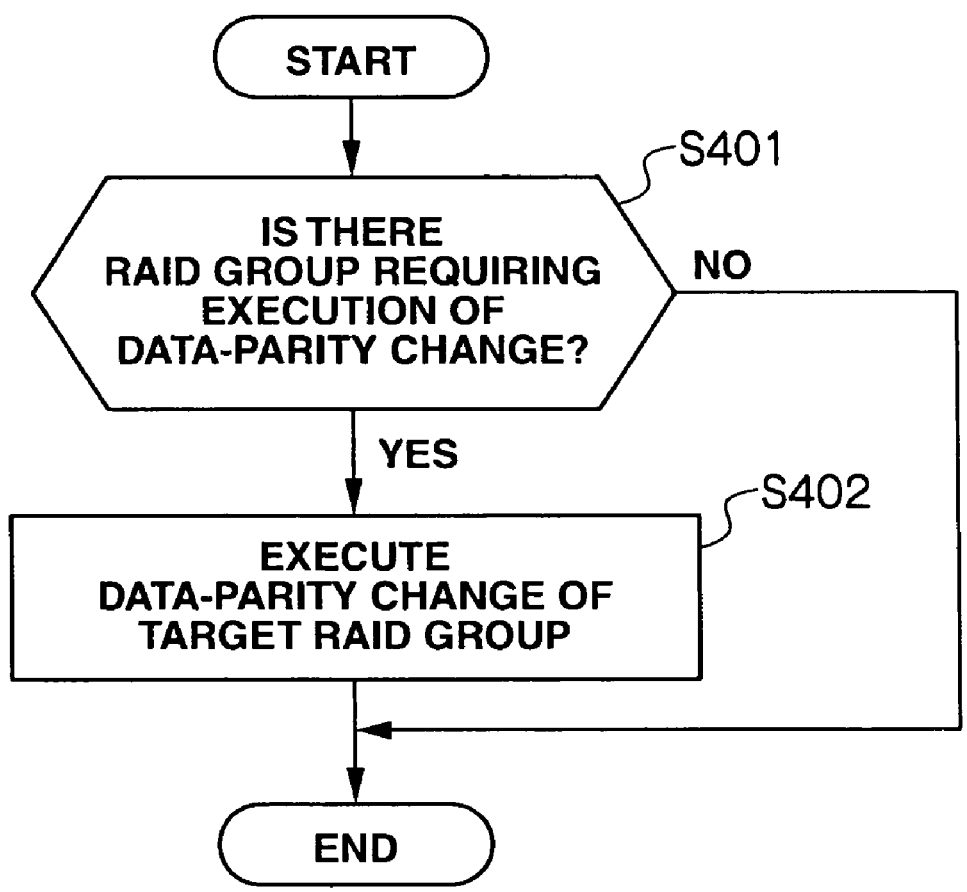
FIG. 5 is a flowchart explaining a data-parity change processing routine.

FIG. 5 is a flowchart of the data-parity change processing. The CPU 120 starts the data-parity change processing at a prescribed timing (described later), and determines whether data-parity change is required targeting all RAID groups 2200 based on information of the data-parity change execution opportunity management table 1320 (step S401) (details will be explained with reference to FIG. 6). When the CPU 120 determines that there is a RAID group 2200 that requires a data-parity change (S401: YES), it executes data-parity change to the target RAID group 2200 (step S402) (details will be explained with reference to FIG. 7). The CPU 120 thereafter ends the data-parity change processing.

Meanwhile, when the CPU 120 determines at step S401 that there is no RAID group 2200 requiring the execution of a data-parity change (S401: NO), it directly ends the data-parity change execution processing.

Incidentally, the data-parity change processing is executed at a periodical timing or an arbitrary timing. Periodical timing, for instance, is execution at regular intervals based on a timer, or execution each time the number of commands received from the host computer 300 reaches a multiple of a specific number. Further, as an example of arbitrary timing, there are cases when an administrator of the storage apparatus 10 commands the execution of the present processing with control software installed in the host computer 300, when the storage apparatus 10 receives a specific command, or when the CPU 120 executes a specific command.

(1) Data-Parity Change Execution/Non-Execution Determination Processing

Figure 6:
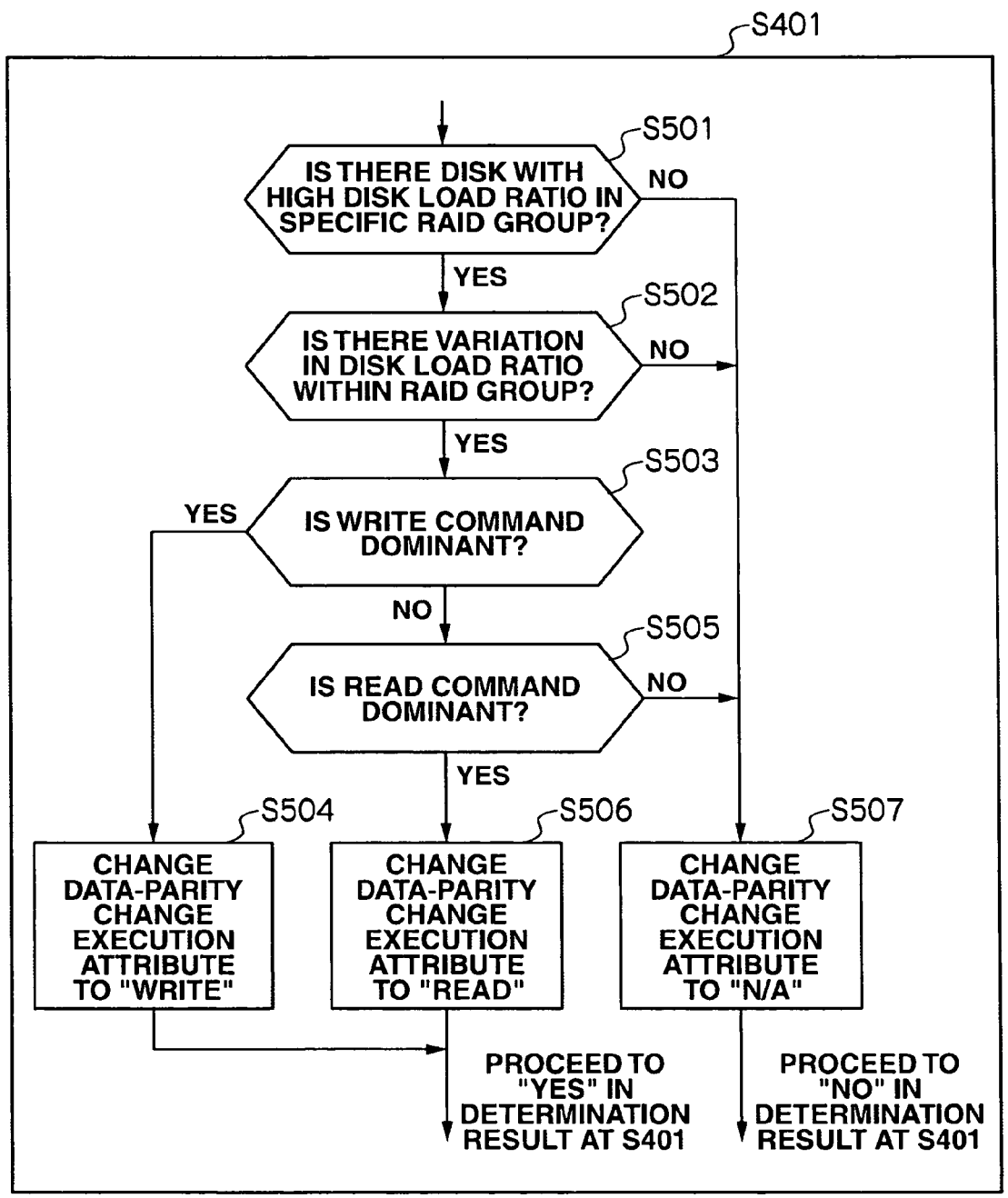
FIG. 6 is a flowchart explaining a data-parity change execution/non-execution determination processing routine.

FIG. 6 is a detailed flowchart of step S401 for executing the data-parity change execution/non-execution determination processing. The CPU 120 determines whether there is a physical disk 2100 with a high load ratio in a specific RAID group 2200 based on the physical disk load ratio column 1323 (step S501).

When the CPU 120 determines that there is a disk 2100 with a high physical disk load ratio (S501: YES), it determines whether there is any variation in the physical disk load ratio among the physical disks 2100 in the RAID group 2200 (step S502).

When the CPU 120 determines that there is variation in the physical disk load ratio among the physical disks 2100 in the RAID group 2200 (S502: YES), it determines whether a write command issued to the RAID group 2200 is dominant based on the average write command ratio column 1325 (step S503). When the CPU 120 determines that the write command is dominant (S503: YES), it changes the data-parity change execution attribute 1327 to "write" (step S504), and proceeds to step S401 with the determination result of "YES" showing that data-parity change is required.

Contrarily, when the CPU 120 determines that the write command is not dominant (S503: NO), it determines whether a read command issued to the RAID group 2200 is dominant based on the average read command ratio column 1326 (step S505). When the CPU 120 determines that the read command is dominant (S505: YES), it changes the data-parity change execution attribute 1327 to "read" (step S506), and proceeds to step S401 with the determination result of "YES" showing that data-parity change is required.

Meanwhile, when the CPU 120 determines that there is no physical disk with a high physical disk load ratio (S501: NO), determines that there is no variation in the physical disk load ratio among the physical disks 2100 in the RAID group 2200 (S502: NO), or determines that the read command is not dominant (S505: NO), it changes the data-parity change execution attribute 1327 to "N/A" (step S507), and proceeds to step S401 with the determination result of "NO" showing that data-parity change is not required.

Here, if the disk load ratio is of a high value at step S501, for instance, the disk load ratio is 100%, or 95% or higher and exceeds a prescribed threshold value, and this shows that the physical disk 2100 is near its processing limit, or has reached its processing limit.

Further, when there is variation in the physical disk load ratio at step S502, for instance, this shows a case where the divergence upon comparing the average disk load ratio 1324 of a specific RAID group 2200 and the physical disk load ratio of the respective physical disks 2100 exceeds a set threshold value, or a case where the absolute value of the difference between the maximum value and the minimum value of the disk load ratio exceeds a set threshold value.

Further, when there is a dominant command at step S503, for instance, this shows a case where, when the set threshold value is set to 60%, the ratio of the issued write command and the read command is 80%:20%; in other words, this shows a case where one of the command ratios is exceeding the set threshold value.

Incidentally, the specific value of the set threshold value used in the determination at step S502 and the set threshold value of the dominant command ratio at step S503 can be changed as a settable tuning parameter using control software installed in the host computer 300.

(2) Data-Parity Change Execution Processing

Figure 7:
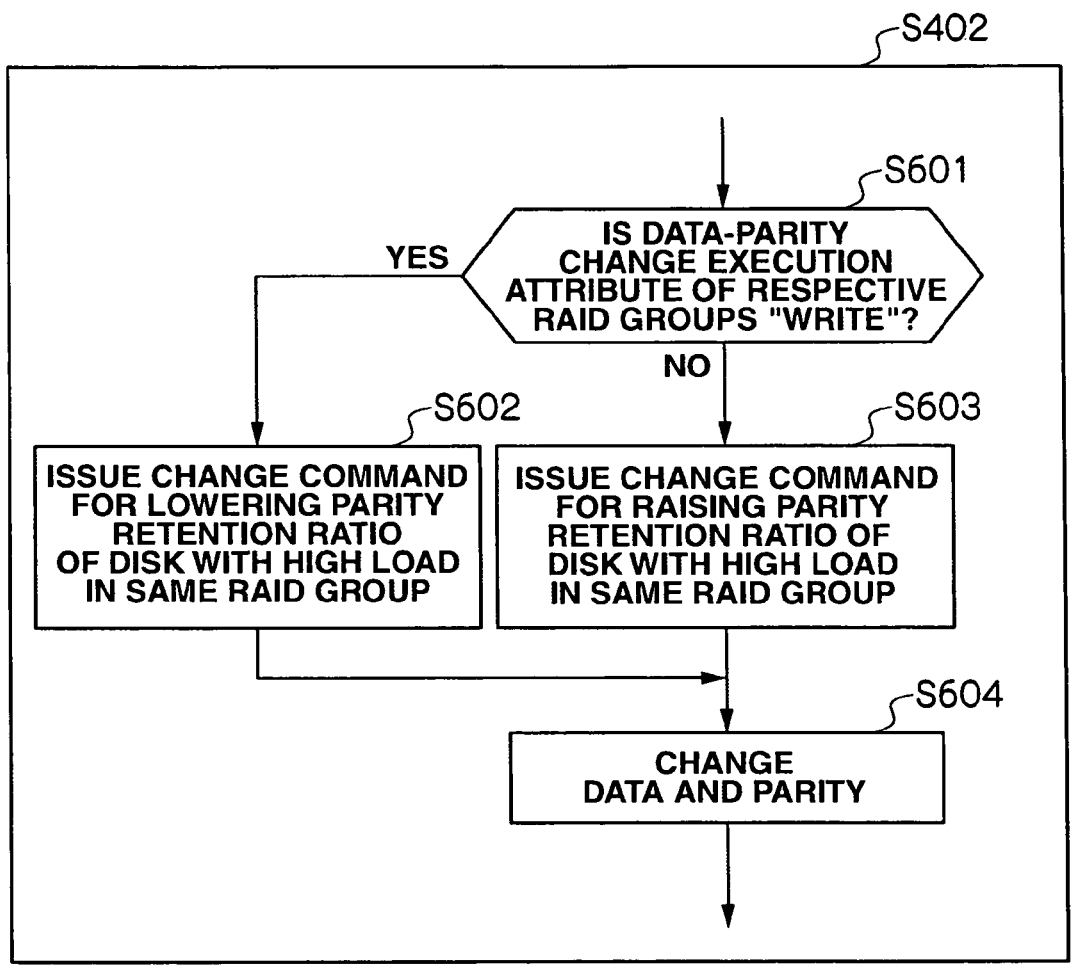
FIG. 7 is a flowchart explaining a data-parity change execution processing routine.

FIG. 7 is a detailed flowchart of step S402 for executing the data-parity change execution processing. When the CPU 120 ends the data-parity change execution/non-execution determination processing at step S401, it starts the data-parity change execution processing, and determines whether the data-parity change execution attribute column 1327 of the RAID group 2200 is "write" (step S601).

When the data-parity change execution attribute column 1327 is "write" (S601:YES), the CPU 120 issues a data-parity change execution command to the physical disk 2100 of the RAID group 2200 for changing the data and parity to lower the ratio for retaining the parity in the physical disk 2100 with a high physical disk load ratio (step S602).

Contrarily, when the data-parity change execution attribute column 1327 is not "write" (S601: NO), the CPU 120 determines whether the data-parity change execution attribute column 1327 is "read", and issues a data-parity change execution command to the physical disk 2100 of the RAID group 2200 for changing the data and parity to raise the ratio for retaining the parity in the physical disk 2100 with a high physical disk load ratio (step S603).

Subsequently, the CPU 120 executes the issued change command and changes the data and parity (step S604). Then, the CPU 120 ends the data-parity change execution processing, and thereafter ends the data-parity change processing.

Figure 8:
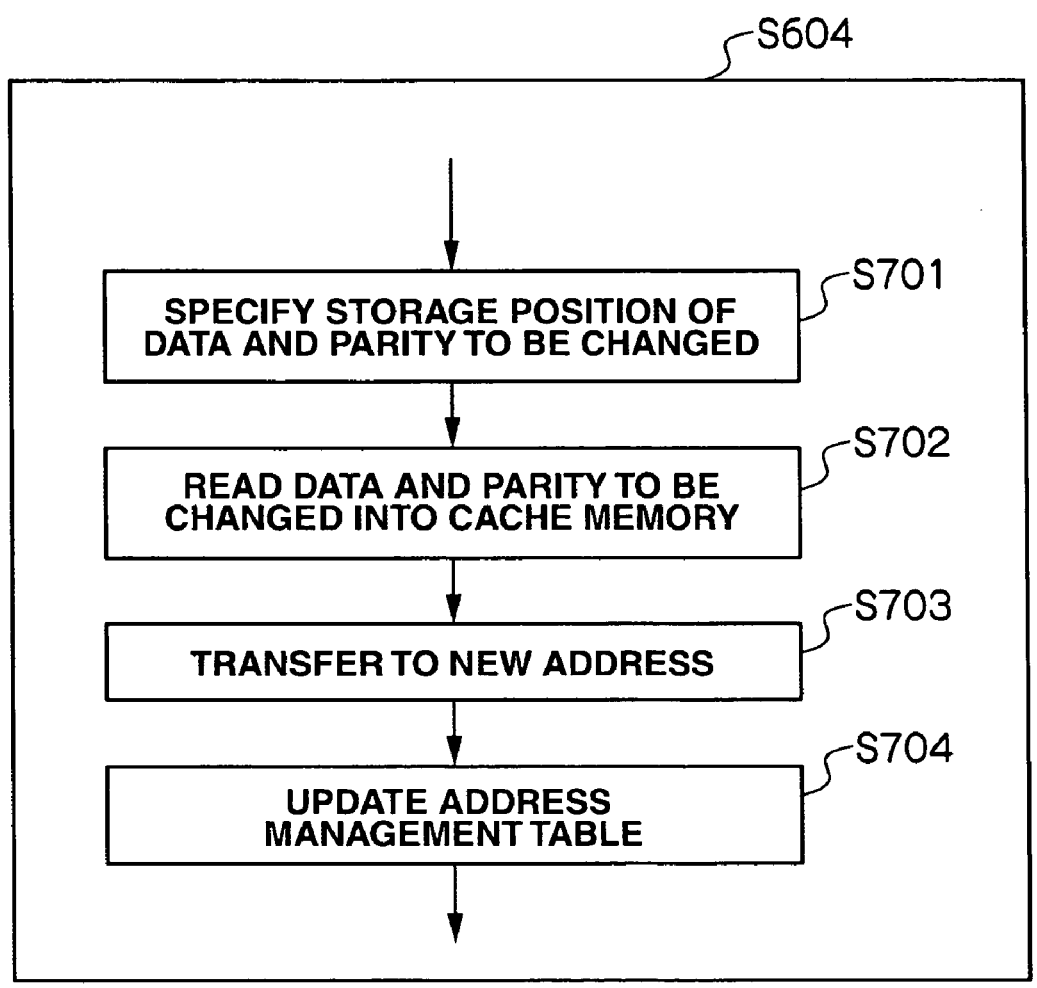
FIG. 8 is a flowchart explaining a data-parity change command execution processing routine.

FIG. 8 is a detailed flowchart of step S604 for executing the data-parity change command execution processing. When the CPU 120 issues a data-parity change execution command at step S602 or at step S603, it specifies the current storage position and change destination of the data and parity to be changed based on the information of the address management table 1310 (step S701).

Subsequently, the CPU 120 reads the data and parity to be changed from the physical disk 2100 into the cache memory 140 (step S702). Then, the CPU 120 transfers the data and parity to be changed, which were read into the cache memory 140, to a new address to become the storage position of the change destination (step S703). By the CPU 120 eventually updating (changing) the address values of the HDD number 13141, top LBA 13142 and end LBA 13143 of the data to be changed and the HDD number 13151, top LBA 13152 and end LBA 13153 of its parity, it updates the address management table 1310 for managing the storage position in the physical disk 2100 (step S704). The CPU 120 thereafter ends the data-parity change command execution processing.

Here, when the data-parity change execution attribute column 1327 is "write", the CPU 120 changes the data and parity so as to raise the ratio of retaining the parity in the physical disk 2100 of the RAID group 2200 with a low physical disk load ratio. Meanwhile, when the data-parity change execution attribute column 1327 is "read", the CPU 120 changes the data and parity so as to raise the ratio of retaining the parity in the physical disk 2100 of the RAID group 2200 with a high physical disk load ratio.

Figure 9:
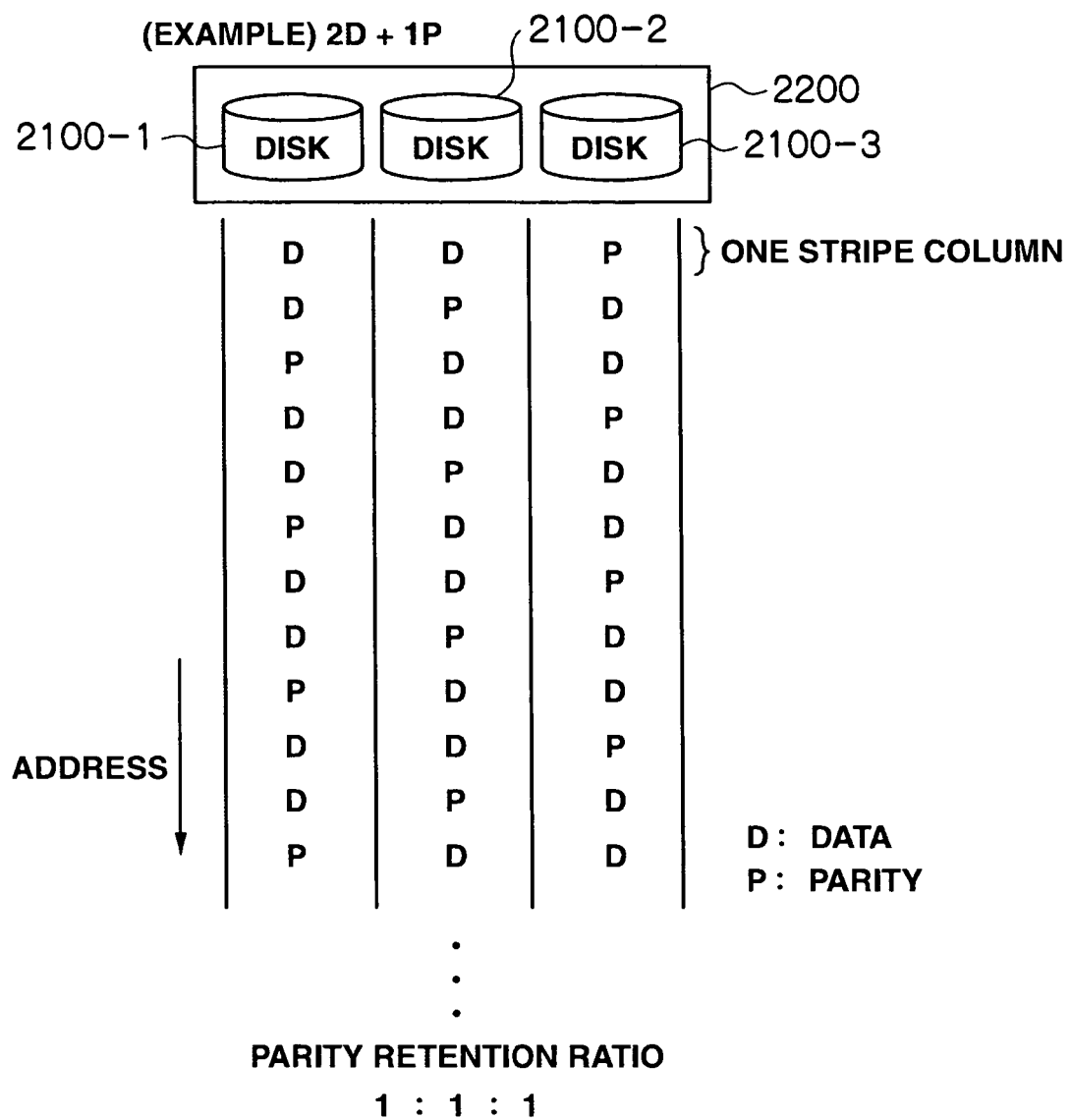
FIG. 9 is a conceptual diagram explaining an example of data-parity change.
Figure 10:
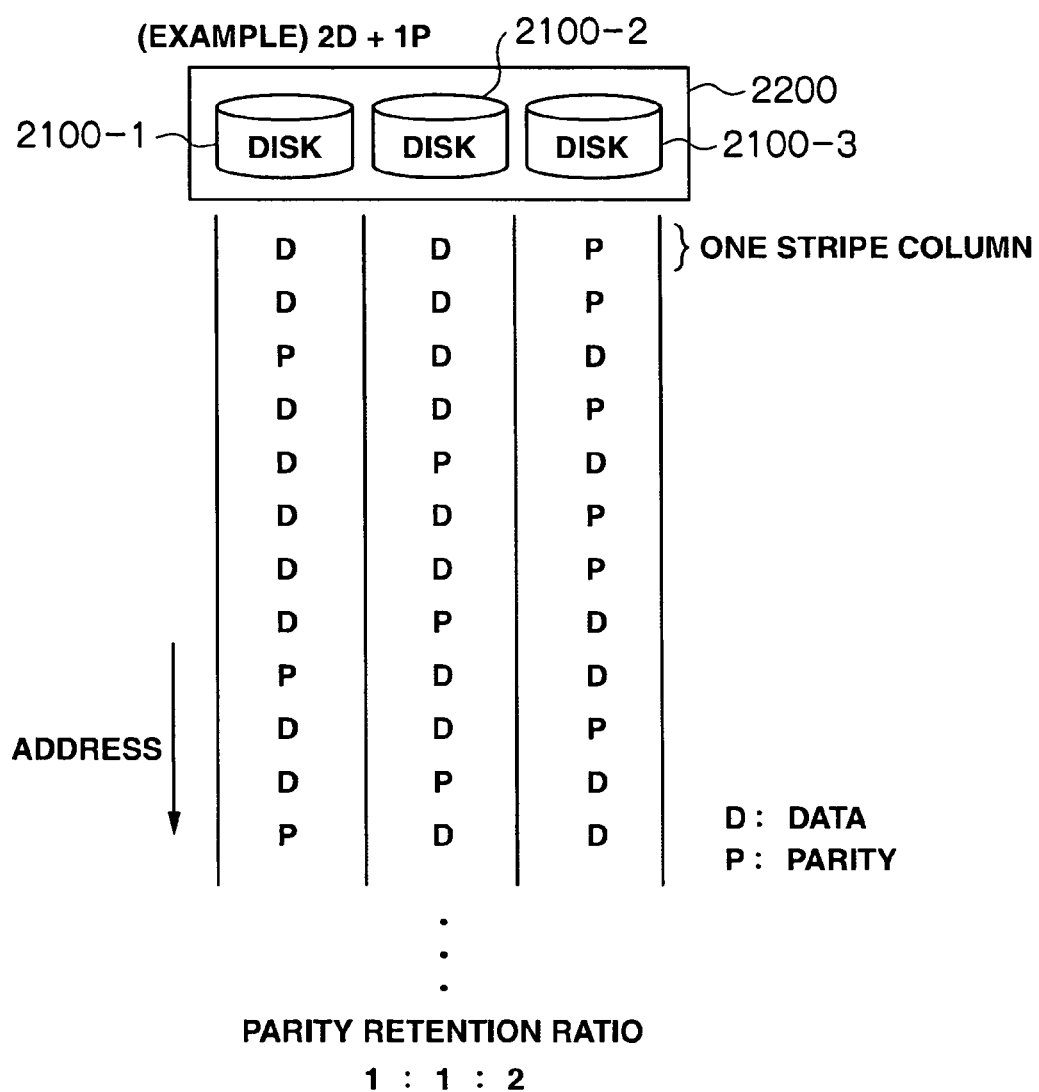
FIG. 10 is a conceptual diagram explaining an example of data-parity change.

Here, an example of changing the data and parity is explained with reference to FIG. 9 and FIG. 10. FIG. 9 and FIG. 10 show change examples in RAID 5 configured from three physical disks. FIG. 9 shows the respective data storage structures in the physical disks 2100 in an ordinary state (where data-parity change is not implemented). In FIG. 9, for example, data is stored so that the parity ratio among the three physical disks 2100 will be 1:1:1.

Here, generally speaking, when performing the data update (write) processing with RAID 5 or RAID 6, it is often the case that the physical disk 2100 retaining parity becomes a higher load in comparison to the physical disk 2100 retaining data. This is because when data update arises, the respective physical disks 2100 will be subject to old data read and old parity read for creating new parity, and new data write and new parity write for writing new data and new parity into the disk, but since data is retained in a plurality of physical disks 2100, not all physical disks 2100 will be necessarily accessed depending on the scope of update. Whereas since parity is retained in a single physical disk 2100, such physical disk 2100 will be accessed each time data update is performed, and a difference will arise in the access frequency between data and parity. Thus, under an I/O environment where data write is dominant, for instance, when the load is concentrated only on a specific physical disk 2100 of the RAID group 2200 configured in RAID 5, load balancing among the physical disks 2100 is sought by lowering the parity ratio of a physical disk 2100 in a high-load state due to the concentrated load, and raising the parity ratio of other physical disks 2100 with a low load to become higher than the physical disk 2100 in a high-load state.

Contrarily, since parity will not be accessed in read processing, the physical disk 2100 retaining parity will become a lower load in comparison to the physical disk 2100 retaining data. Thus, in an I/O environment where data read is dominant, load balancing among the physical devices 2100 will be enabled by raising the parity ratio of a physical disk 2100 in a high-load state to become higher than the other physical disks 2100, and lowering the parity ratio of the other physical disks 2100 with a low load to become lower than the physical disk 2100 in a high-load state.

Specifically, with the storage apparatus 10, when it is determined that the physical disk load ratio of a physical disk 2100-3 of the RAID group 2200 illustrated in FIG. 9 is high, there is variation in the physical disk load ratios among the physical disks 2100 in the RAID group 2200, and the write command issued to the RAID group 2200 is dominant, the data and parity are changed so as to lower the ratio of retaining parity in the physical disk 2100-3 with a high physical disk load ratio. In other words, with the storage apparatus 10, parity of the physical disk 2100-3 of the corresponding stripe line and data of the physical disk 2100-1 or 2100-2 are changed.

Further, with the storage apparatus 10, when it is determined that the physical disk load ratio of the physical disk 2100-3 of the RAID group 2200 illustrated in FIG. 9 is high, there is variation in the physical disk load ratios among the physical disks 2100 in the RAID group 2200, and the read command issued to the RAID group 2200 is dominant, the data and parity are changed so as to raise the ratio of retaining parity in the physical disk 2100-3 with a high physical disk load ratio. In other words, with the storage apparatus 10, data of the physical disk 2100-3 of the corresponding stripe line and parity of the physical disk 2100-1 or 2100-2 are changed.

Incidentally, FIG. 10 shows a data storage structure in the physical disks 2100 after implementing the data-parity change. FIG. 10, for example, shows a state where the positions of data and parity in the same stripe line are respectively changed, and the parity ratio among the three physical disks 2100 is changed to 1:1:2. In other words, FIG. 10 shows the state after changing the parity retention ratio in a case when it is determined that the physical disk load ratio of the physical disk 2100-3 of the RAID group 2200 illustrated in FIG. 9 is high, there is variation in the physical disk load ratios among the physical disks 2100 in the RAID group 2200, and the read command issued to the RAID group 2200 is dominant.

Further, the change pattern for designating the parity ratio or the like of physical disks 2100 can be changed to an arbitrary ratio by the administrator as a changeable tuning parameter using control software installed in the host computer 300 of the storage apparatus 10. Moreover, as a setting item of the change pattern, a target range of changing the positions of data and parity in a single process may be designated. Here, as the target range, it is possible to target all physical disk extents at once, target an arbitrary stripe line unit, and so on.

Like this, with the storage system 1, when the load is concentrated on a specific physical disk 2100 in the RAID group 2200 and the read command or the write command is dominant, the data and parity is changed for each stripe line of the physical disks 2100 in the RAID group 2200 by changing the parity ratio of the physical disks 2100 in the RAID group 2200.

Accordingly, when the load is concentrated on a specific physical disk 2100, since such load is equalized with the physical disks 2100 in the same RAID group 2200, it is possible to avoid a diskneck and subject the physical disk 2100 to load balancing, whereby high-speed I/O performance can be maintained.

In other words, with the present invention, when the load is concentrated only on a specific physical disk, the parity ratio of the physical disks configuring the RAID group is changed. Thus, it is possible to realize a storage apparatus capable of equalizing the load balance of the physical disks, avoiding the generation of a diskneck, and maintaining high-speed I/O processing.

The present invention can be broadly applied to various types of storage apparatuses configuring a RAID group from a plurality of physical disks.

What is claimed is:

1. A storage apparatus having a plurality of physical devices for balancing and retaining divided data and parity of said data, in which data sent from a host computer is divided and stripped across the plurality of physical devices, comprising:

a load ratio calculation unit for calculating an operating ratio of said plurality of physical devices, wherein the operating ratio indicates a work load on a physical device;

a load ratio determination unit for determining whether said operating ratio of said plurality of physical devices calculated by said load ratio calculation unit is equal to or greater than a first threshold value;

a command ratio determination unit for determining whether a write command ratio on each of the plurality of physical devices or a read command ratio on each of the plurality of physical devices is equal to or greater than a second threshold value, when said load ratio determination unit determines that said operating ratio of at least one of said plurality of physical devices is equal to or greater than said first threshold value, wherein the write command ratio is a number of write commands to a number of read commands issued from said host computer and the read command ratio is a ratio of said number of read commands to said number of write commands issued from said host computer;

a change unit for changing said parity retained in said at least one of said plurality of physical devices, and data retained in another physical device of said plurality of physical devices, so as to lower a ratio for retaining parity of said at least one of said plurality of physical devices determined by said load ratio determination unit as being equal to or greater than said first threshold value, when said command ratio determination unit determines that said write command ratio is equal to or greater than said second threshold value, wherein said change unit changes data retained in said at least one of said plurality of physical devices, and parity retained in said another physical device of said plurality of physical devices so as to raise said ratio for retaining said parity of said at least one of said plurality of physical devices determined by said load ratio determination unit as being equal to or greater than said first threshold value, when said command ratio determination unit determines that said read command ratio is equal to or greater than said second threshold value, wherein the change unit lowers or raises the ratio by moving the parity from one physical device to another.

2. The storage apparatus according to claim 1, wherein said load ratio determination unit determines, with respect to a group configured from said at least one of said plurality of physical devices, whether said operating ratio of said at least one of said plurality of physical devices in said group a is equal to or greater than said first threshold value;

wherein said command ratio determination unit determines whether said write command ratio of said write command issued from said host computer to said group, or said read command ratio of said read command issued from said host computer to said group is equal to or greater than said second threshold value, and wherein said change unit changes said data and said parity among said plurality of physical devices in said group.

3. The storage apparatus according to claim 2, wherein said load ratio calculation unit calculates an average operating ratio of said at least one of said plurality of physical devices in said group, wherein said load ratio determination unit determines whether a divergence of said average operating ratio calculated by said load ratio calculation unit, and said operating ratio of said at least one of said plurality of physical devices in said group, is equal to or greater than a third threshold value, and wherein said command ratio determination unit determines whether said write command ratio or said read command ratio is equal to or greater than said second threshold value, when said load ratio determination unit determines that said divergence of said average operating ratio, and said operating ratio of said at least one of said plurality of physical devices in said group is equal to or greater than said third threshold value.

4. The storage apparatus according to claim 2, wherein said load ratio determination unit determines whether an absolute value of a difference between a maximum value and a minimum value of said operating ratio of said at least one of said plurality of physical devices in said group is equal to or greater than a fourth threshold value, and wherein said command ratio determination unit determines whether said write command ratio or said read command ratio is equal to or greater than said second threshold value, when said load ratio determination unit determines that said absolute value of said difference between said maximum value and said minimum value of said operating ratio is equal to or greater than said fourth threshold value.

5. The storage apparatus according to claim 2, wherein said change unit changes said parity retained in said at least one of said plurality of physical devices and said data retained in said another physical device of said plurality of physical devices in said group, so as to lower said ratio for retaining said parity of said at least one of said plurality of physical devices in said group determined by said load ratio determination unit as equal to or greater than said first threshold value, when said command ratio determination unit determines that a said write command ratio is equal to or greater than said second threshold value.

6. The storage apparatus according to claim 2, wherein said change unit changes said data retained in said at least one of said plurality of physical devices, and said parity retained in said another physical device of said plurality of physical devices in said group so as to raise said ratio for retaining said parity of said at least one of said plurality of physical devices in said group determined by said load ratio determination unit as equal to or greater than said first threshold value, when said command ratio determination unit determines that said read command ratio is equal to or greater than said second threshold value.

7. A load balancing method of a storage apparatus having a plurality of physical devices for balancing and retaining divided data and parity of said data, in which data sent from a host computer is divided and stripped across the plurality of physical devices, comprising:

a first step for calculating an operating ratio of said plurality of physical devices, wherein the operating ratio indicates a work load on a physical device;

a second step for determining whether said operating ratio of said plurality of physical devices calculated at said first step is equal to or greater than a first threshold value;

a third step for determining whether a write command ratio on each of the plurality of physical devices or a read command ratio on each of the plurality of physical devices is equal to or greater than a second threshold value, when it is determined at said second step that said operating ratio of at least one of said plurality of physical devices is equal to or greater than said first threshold value, wherein the write command ratio is a number of write commands to a number of read commands issued from said host computer and the read command ratio is a ratio of said number of read commands to said number of write commands issued from said host computer;

a fourth step for changing said parity retained in said at least one of said plurality of physical devices, and data retained in another physical device of said plurality of physical devices, so as to lower a ratio for retaining parity of said at least one of said plurality of physical devices determined by said second step as being equal to or greater than said first threshold value, when it is determined at said third step that said write command ratio is equal to or greater than said second threshold value, wherein said fourth step changes data retained in said at least one of said plurality of physical devices, and parity retained in said another physical device of said plurality of physical devices so as to raise said ratio for retaining said parity of said at least one of said plurality of physical devices determined by said second step as being equal to or greater than said first threshold value, when said third step determines that said read command ratio is equal to or greater than said second threshold value, wherein the fourth step lowers or raises the ratio by moving the parity from one physical device to another.

8. The load balancing method according to claim 7, wherein at said second step, with respect to a group configured from a said at least one of said plurality of physical devices, whether said operating ratio of said at least one of said plurality of physical devices in said group is equal to or greater than said first threshold value is determined, wherein at said third step, whether a command ratio of said write command issued from said host computer to said group, or said read command ratio of said read command issued from said host computer to said group is equal to or greater than said second threshold value is determined, and wherein at said fourth step, said data and said parity are changed among said plurality of physical devices in said group.

9. The load balancing method according to claim 8, wherein at said first step, an average operating ratio of said at least one of said plurality of physical devices in said group is calculated, wherein at said second step, whether a divergence of said average operating ratio calculated by said first step and said operating ratio of said at least one of said plurality of physical devices in said group is equal to or greater than a third threshold value is determined, and wherein at said third step, whether said write command ratio or said read command ratio is equal to or greater than said second threshold value, is determined when it is determined at said second step that said divergence of said average operating ratio of said at least one of said plurality of physical devices in said group and the operating ratio of said physical devices in said group is equal to or greater than said third threshold value.

10. The load balancing method according to claim 8,
wherein at said second step, whether an absolute value of a difference between a maximum value and a minimum value of said operating ratio of said at least one of said plurality of physical devices in said group is equal to or greater than a fourth threshold value is determined, and
wherein at said third step, whether said write command ratio or said read command ratio is equal to or greater than said second threshold value, is determined when it is determined at said first step that said absolute value of said difference between said maximum value and said minimum value of said operating ratio is equal to or greater than said fourth threshold value.

11. The load balancing method according to claim 8,
wherein at said fourth step, data and parity are changed so as to lower said ratio for retaining said parity of said at least one of said plurality of physical devices in said group determined at said third step as equal to or greater than said first threshold value, when it is determined at said second step that said write command ratio is equal to or greater than said second threshold value.

12. The load balancing method according to claim 8,
wherein at said fourth step, data and parity are changed so as to raise said ratio for retaining said parity of said at least one of said plurality of physical devices in said group determined at said third step as equal to or greater than said first threshold value, when it is determined at said second step that said read command ratio is equal to or greater than said second threshold value.

* * * * *